(12) United States Patent
Jensen et al.

(10) Patent No.: US 7,509,537 B1
(45) Date of Patent: Mar. 24, 2009

(54) PROGNOSTIC PROCESSOR SYSTEM FOR REAL-TIME FAILURE ANALYSIS OF LINE REPLACEABLE UNITS

(75) Inventors: David W. Jensen, Marion, IA (US); James A. Marek, Anamosa, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 450 days.

(21) Appl. No.: 11/345,704

(22) Filed: Feb. 2, 2006

(51) Int. Cl.
*G06F 11/00* (2006.01)
(52) U.S. Cl. .......................... 714/47; 714/48; 714/712
(58) Field of Classification Search .................. 714/47, 714/48
See application file for complete search history.

(56) References Cited

U.S. PATENT DOCUMENTS

| | | | | |
|---|---|---|---|---|
| 5,890,095 | A * | 3/1999 | Barbour et al. | 702/40 |
| 6,192,983 | B1 * | 2/2001 | Neuroth et al. | 166/250.15 |
| 6,353,902 | B1 * | 3/2002 | Kulatunge et al. | 714/712 |
| 6,434,451 | B1 * | 8/2002 | Lohberg et al. | 701/1 |
| 6,947,797 | B2 | 9/2005 | Dean et al. | 700/79 |
| 7,062,358 | B2 * | 6/2006 | Larsson et al. | 700/282 |
| 2002/0078173 | A1 * | 6/2002 | Horn et al. | 709/218 |
| 2003/0114966 | A1 * | 6/2003 | Ferguson et al. | 701/29 |
| 2004/0039502 | A1 * | 2/2004 | Wilson et al. | 701/29 |
| 2004/0135034 | A1 * | 7/2004 | Abel et al. | 244/165 |
| 2004/0199897 | A1 * | 10/2004 | Ghercioiu et al. | 717/101 |
| 2004/0260485 | A1 * | 12/2004 | Rachlin | 702/47 |
| 2005/0049753 | A1 * | 3/2005 | Garcia-Ortiz | 700/275 |
| 2005/0196867 | A1 * | 9/2005 | Bower et al. | 436/43 |
| 2006/0126608 | A1 * | 6/2006 | Pereira et al. | 370/360 |
| 2006/0230313 | A1 * | 10/2006 | Grichnik et al. | 714/26 |
| 2007/0078614 | A1 * | 4/2007 | Discenzo et al. | 702/60 |

\* cited by examiner

*Primary Examiner*—Scott T. Baderman
*Assistant Examiner*—Loan Truong

(57) ABSTRACT

A prognostic processor for predicting machine failure in avionics electronics comprises prognostic capabilities in a single integrated circuit, with a processor, volatile and non-volatile memory, clock, on-chip and off-chip sensors and transducers, A/D converters, a common I/O interface adapted to be employed in a network of similar prognostic processors, and predictive Failure Analysis (FA) model software, which may be distributed throughout the network. The FA software employs a log file history, with the log file history storing data collected by the prognostic processor, real-time execution of a predictive model, with the ability to update the FA model with data from field failures. The prognostic processor network supports hierarchical processing to work with multiple prognostic processors. The prognostic processor system is applicable to FA monitoring of a wide range of avionics electronic equipment, in particular, Line Replacement Units (LRUs).

4 Claims, 3 Drawing Sheets

PROGNOSTIC PROCESSOR SYSTEM FOR REAL-TIME FAILURE ANALYSIS OF LINE REPLACEABLE UNITS

CROSS-REFERENCE TO RELATED APPLICATIONS

[none]

BACKGROUND OF THE INVENTION

1. Field of Invention

The present invention relates generally to the field of failure or fault analysis (FA) of electronic systems, in particular avionic electronic systems, and even more particularly line replacement units (LRUs) in those systems.

2. Description of Related Art

Avionics electronic systems employ redundant LRUs so that when one fails, the other is available during flight. Such redundancy creates obvious increases the cost of the system. There are additional costs in these systems with failing LRUs. When a unit fails, aircraft are generally not allowed to operate unless both redundant systems are functional. Since an unscheduled delay of a Boeing 747 airplane can cost $1000 a minute with customer, crew, and schedule impacts, it is important to estimate when a LRU is about to fail. Historically, LRUs have been subject to failure analysis by manually estimating when the units will fail.

U.S. Pat. No. 6,947,797 (Dean et al.) discloses a method and system for diagnosing machine malfunctions through Case Base Reasoning. Dean et al. does not, however, disclose the prognosis of machine failure. Further, the '797 patent, while suggesting collecting data in real-time, does not utilize this data in real-time to predict failure, but employs the data later over a selectively focused time interval to diagnose a repair.

What is lacking in the prior art is a method and apparatus for real-time failure analysis of a LRU using self-contained computer-automated means.

SUMMARY OF THE INVENTION

Accordingly, an aspect of the present invention is to provide an automated computer driven system and method of determining when electronic systems, such as a Line Replacement Units (LRUs), are likely to fail.

The prognostic processor system of the present invention employs a processor executing a predictive failure analysis model, the model and processor interacting with processor memory, sensors, peripherals, I/O controllers and other similar failure analysis systems.

Preferably the prognostic processor is on a single chip that is proximate to or integral with a Line Replacement Unit (LRU). The prognostic processor may interact with other prognostic processors as part of a network interconnected along a system bus.

The present invention employs hierarchical prognostic processing where one or more prognostic processors interact with sensors and historic log information to predict failures on one or more LRUs.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Figure 1:
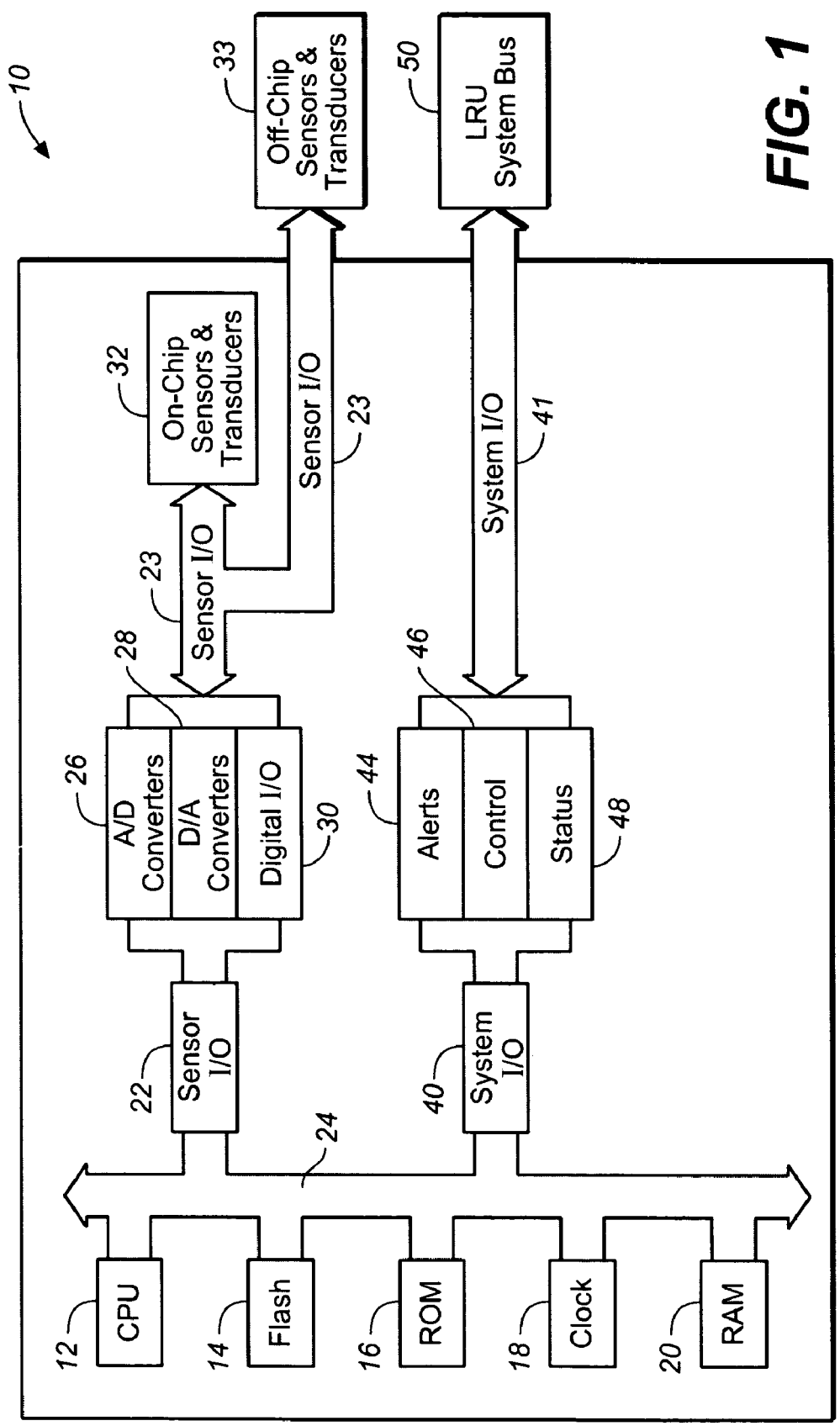
FIG. 1 is a block diagram detailing a prognostic processor.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

Turning attention now to FIG. 1, the prognostic processor of the present invention, there is shown a block diagram of a single complete prognostic processor. A prognostic processor 10, preferably residing on a single integrated circuit, is integral with or proximate to a LRU (not shown). The prognostic processor operatively interconnects in a working relationship a microcontroller or other compact processor 12 (generally, a processor or CPU), non-volatile memory 14 (e.g. EPROM, EEPROM, flash memory) that stores a time sequence of individual measurements obtained from sensors on the LRU, a program memory 16 (e.g. ROM) where the prognostic model or software program running the processor 12 of the present invention resides, as well as any real-time operating system, and is loaded upon boot-up, an accurate clock 18, RAM memory 20, which holds the program for operation of the processor 12 after startup, I/O, which can be both digital and analog I/O, the I/O comprising sensor I/O 22 and system I/O 40 receiving and transmitting data, in a preferred embodiment each having its own bus, and with all of these components interconnected along an prognostic processor internal system bus 24.

Although using the teachings of the present invention it is possible to combine all busses described herein into a single bus, in the preferred embodiment the sensor I/O 22 and the system I/O 40 are dual bus, that is, having separate busses from one another. The sensor I/O 22 generally senses data generally transported in serial fashion (typically the data being in the form of binary, analog and digital signals, such as from on-chip and off-chip transducers), and has its own sensor I/O bus 23, while the system I/O 40 senses computer commands (typically digital data in the form of binary digital signals transported in parallel fashion), and has its own system I/O bus 41.

The sensor I/O 22 operatively interacts with internal (on-chip) components and devices—e.g., A/D and D/A converters, digital I/O, as well as on-chip sensors and on-chip transducers—as shown in FIG. 1. On-chip components and devices that interact with the sensor I/O 22 to send and receive data from an LRU include A/D converters 26, D/A converters 28, digital I/O 30, as well as On-Chip Sensors and Transducers 32.

The sensor I/O 22 further operatively interacts with external (off-chip) components and devices—e.g., peripherals, sensors, instruments and transducers, such as Off-Chip Sensors and Transducers 33—to collect data from an LRU.

On-Chip Sensors and Transducers 32 are those sensors and transducers that fit on a single IC chip, and may include the same sensors and transducers as found in the Off-Chip Sensors and Transducers 33 described below, provided these components and devices can fit on a single integrated circuit. With MEMS, micromachines, nanotechnology and increased miniaturization at the process level more and more sensors and transducers previously off-chip are becoming feasible on-chip.

The On-Chip Sensors and Transducers include, but are not limited to: sensors/meters for measuring: electronic life, accumulative vibration, noise, current, voltage, power (including peak power), corrosion, temperature; resistance, continuity meters for indicating electric and/or mechanical contact such as for packaging contact; sensors for measuring physical and logical parameters on an LRU such as the number of times a switch on the LRU was depressed, power glitches, power-on hours of the LRU, accumulative vibration on the LRU and other valuable test history. The On-Chip Sensors and Transducers may be supplemented by physical sensors such as thermistors, accelerometers, including latching accelerometers, voltage monitors, and strain gauges.

Off-chip components and devices that interact with the sensor I/O 22 to send and receive data from an LRU include Off-Chip Sensors and Transducers 33 that monitor LRUs, which include, but are not limited to: meters for measuring: electronic life, accumulative vibration, noise, current, voltage, power (including peak power), corrosion, resistance, temperature; continuity meters for indicating electric and/or mechanical contact such as for packaging contact; sensors for measuring physical and logical parameters on an LRU such as the number of times a switch on the LRU was depressed, detection of biological or chemical agents, power glitches, power-on hours, accumulative vibration on the LRU and other valuable test history. The Off-Chip Sensors and Transducers may be supplemented by physical sensors such as thermistors, accelerometers, including latching accelerometers, voltage monitors, and strain gauges.

The sensor I/O 22 may communicate along a sensor I/O bus 23, as indicated in the drawings with a double-headed arrow, which may share identical paths with the internal prognostic processor system bus 24.

In addition to sensor I/O 22, the prognostic processor 10 has system I/O 40. System I/O 40 operatively interacts with components and devices, including other prognostic processors, to send and receive data, as explained further herein, and which may further include off-chip components and devices such as maintenance devices, test devices, external peripherals, and other prognostic processors. System I/O 40 interfaces with the processor 12 and may communicate along a system I/O bus 41, as indicated in the drawings with a double-headed arrow, which share identical paths with system bus 24. System I/O may also communicate with other prognostic processors and maintenance equipment along a LRU System Bus 50, as explained further herein.

As indicated in FIG. 1, system I/O 40 and its associated bus will support signals or messages defining system data comprising state and control messages such as Alerts 44, Control 46 and Status 48 of the monitored LRU. The Alerts messages will indicate to the external LRU system that a failure is being predicted by the Fault Analysis model of the prognostic processor. The Control messages will allow an external LRU system, external equipment monitor or maintenance diagnostic equipment (e.g., maintenance equipment 260 in FIG. 2), to control and monitor the prognostic processor 10. For instance, queries can be issued to the prognostic processor to read registers and obtain history data. Results requested through Control messages to the prognostic processor are returned by the prognostic processor to external devices through Status messages.

The prognostic processor 10 communicates with an LRU through LRU System Bus 50, which may be also part of a network of LRUs and prognostic processors. Preferably both sensor I/O and system I/O interfaces are embodied with common, open-source standards, e.g., they may be USB, Firewire (IEEE-1394), LVDS, or other serial, Ethernet, or parallel bus interface.

The processor 12 preferably is a general-purpose processor manufactured as high volume parts, but it may also be a specialty ASIC, programmable FPGA, or any combination thereof. Each such processor interacts with memory, such as volatile primary memory (e.g., RAM 20), which holds dynamic and temporary results from the prognostic program or FA model that predicts failure on LRUs as the program is being run by the CPU 12, and non-volatile secondary memory (e.g., a hard drive, flash memory 14, EEPROM, MRAM), which holds permanent and historic information, such as the FA model, run time operating system, and the data collected from the sensors, in a log file used by the prognostic program for maintenance and execution of the FA model. The log file stored in non-volatile memory can hold cumulative data collected from the sensors over time, to form a historic log.

An accurate clock 18 is used by the prognostic processors, which may be either externally applied to the processors 12 respectively, as shown, or be internal to the processor. A clock is necessary to estimate time to failure.

System software for the prognostic program for the present invention, when standing alone with one prognostic processor or in a distributed system when in a network of such prognostic processors, would include routines to manage the collection of data at prescribed intervals (e.g., a time sequence of individual measurements obtained from sensors on the LRUs) and models of the relationships between the various sensors and the deterioration processes they monitor. Such a model may be as simple as counting button presses or as complex as a causal network.

Figure 2:
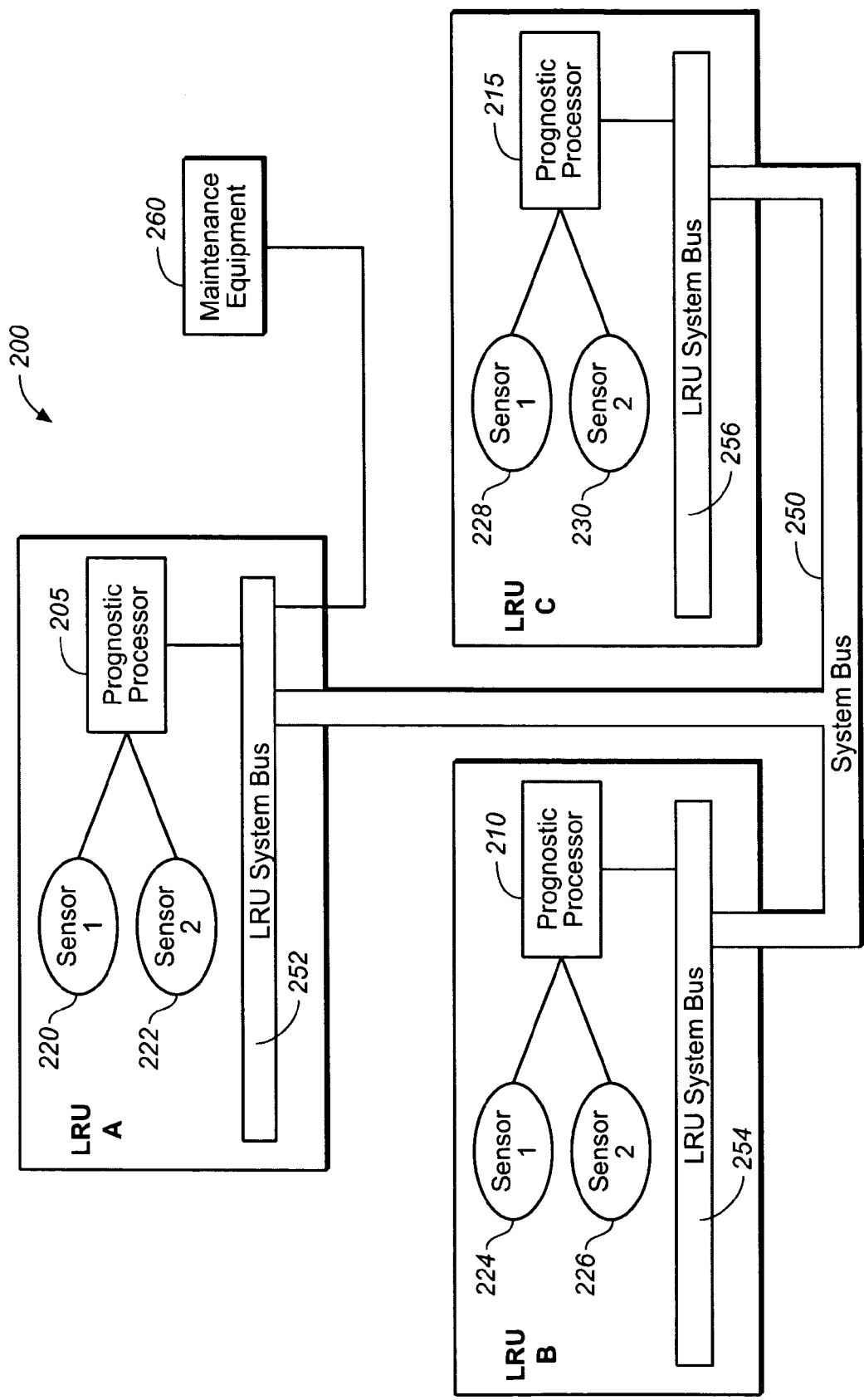
FIG. 2 is a block diagram of a prognostic processor system according to the present invention comprising a network of three prognostic processors.

Turning attention to FIG. 2, there is shown an example prognostic processor system according to the present invention. The prognostic processor system 200 comprises a network of three prognostic processors. In general, any number of prognostic processors may be networked. The prognostic processor system of the present invention is hierarchical, in that several prognostic processors may be connected together through an interface to network a plurality of prognostic processors, each of which may be standalone, and with one prognostic processor controlling the others. In FIG. 2 similar looking block diagram symbols indicate conceptually similar components.

Thus shown in FIG. 2 are a plurality of prognostic processors 205, 210, 215, as explained herein, with each prognostic processor monitoring a Line Replaceable Unit (LRU), A, B and C, respectively. One or more off-chip sensors are also shown: off-chip sensors 220, 222 are shown associated with prognostic processor 205; likewise prognostic processor 210 is shown sampling off-chip sensors 224, 226, while prognostic processor 215 is operatively connected to off-chip sensors 228, 230. An LRU system bus is associated with each of the LRUs, and interfaces with the system I/O of each of the prognostic processors, shown conceptually in FIG. 2 as LRU System Buses 252, 254 and 256 for prognostic processors 205, 210, and 215, respectively, in order to network all of the prognostic processors 205, 210 and 215 along a network system bus 250. An external Maintenance Equipment unit 260 controls and monitors the prognostic processor of LRU A, and through the network can control and monitor the prognostic processors of the other LRUs in a hierarchical manner (e.g., LRU A can control LRUs B and C).

The network of FIG. 2 is hierarchical, with the prognostic processor 205 having a system I/O 252 interface that connects to the other system I/O interfaces 254 and 256 of other prognostic processors 210 and 215. This hierarchy is desirable to collect system fault information for presentation to maintenance units, such as external maintenance equipment 260. The highest prognostic processor (205, associated with LRU A) in the system would analyze fault prediction results from lower prognostic processors (210 and 215, associated with LRUs B and C) to provide a robust complex system fault prediction capability. This same connection scheme could be used in a daisy-chained manner to provide simple system fault failure detection. Further, the network of prognostic processors may be peer-to-peer.

As explained herein, the off-chip sensors associated with the prognostic processors provides access to a broad set of system characteristics as they relate to LRUs, including but not limited to voltage, current, power (including peak power and power glitches and spikes), resistance, thermal parameters, temperature, electronic life, vibration (including accumulated vibration), detection of biological or chemical agents, electrical and mechanical contacts including packaging contacts, noise, resets of an LRU, the number of times a switch is depressed on an LRU, power-on hours of an LRU, acceleration, corrosion, mechanical stress and strain. In general any instrument, transducer or sensor that can help predict when failure is going to occur in a machine can be monitored and sampled for data by the prognostic processor of the present invention. Most sensors provide their data through an analog interface; however, some sensors provide their data through a standard computer interface such as parallel I/O, serial I/O, and Ethernet. These sensors convert measurements such as temperature, voltage, and resistance to a digital format and communicate using standard computer protocols to convey that data over the standard computer interface The sensor interface of each prognostic processor provides access to these digital control interfaces. The prognostic processor maintains a time history of these physical and logical sensor parameters to provide a history of measurements on the LRU including LRU resets, the number of times a switch is depressed, power glitches, power-on hours, accumulative vibration, and other valuable test history.

For multiple LRU systems, when connected as shown in FIG. 2, one of the prognostic processors (e.g., the prognostic processor associated with LRU A) could maintain the history as recorded from multiple prognostic processors (e.g. the prognostic processors associated with LRUs A, B, C), and one or more of these systems could execute models that predict future system failures. A simple example of this history being used for failure prediction is maintaining a count on the number of times a button has been pushed. The sensor I/O monitors the voltage transition associated with the button push and adds a count to an entry in a history log, which is stored in permanent, non-volatile memory. Buttons are built, purchased, and tested to perform a known quantity of pushes. As the button nears its end of life, the prognostic processor would recognize that the number of button pushes is nearing this critical number. The prognostic processor would notify the LRU or maintenance equipment of the impending failure of the switch.

When the prognostic processors are connected together in a network, be it daisy chained, hierarchical or a peer-to-peer network, the software of the present invention is software distributed in a plurality of memories throughout the network, and may include distributed objects.

The type of LRU sensors 42, 44, 46 may include thermistors (to measure temperature variation), accelerometers (to measure vibration), including latching accelerometers (which capture the occurrence of shock and vibration levels over a preset threshold), voltage monitors (to monitor low voltages and voltage spikes), strain gauges (to measure movement, stress, and strain), corrosion monitoring chip, and the like.

Figure 3:
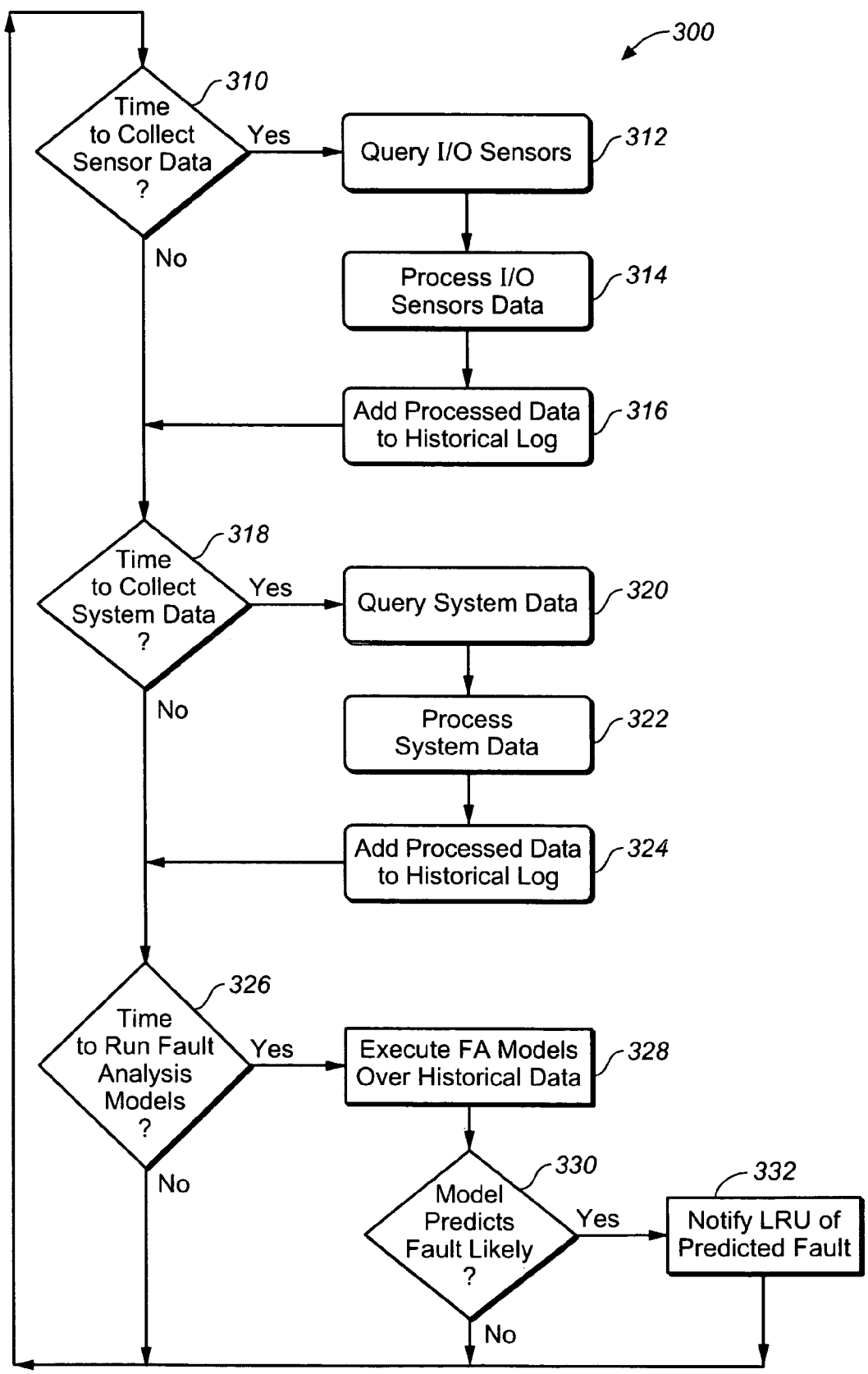
FIG. 3 is a flowchart illustrating the method of the present invention.

Turning attention now to FIG. 3, an aspect of the present invention is to provide a method for a system, controlled by computer software, to predict failure on avionic electronics, in particular LRUs. FIG. 3 shows a high-level flowchart 300 for the computer-controlled method used by the present invention to achieve this end. The present invention may be written as a software program in any language and in any style e.g., as procedural, model based, or object-oriented event driven. Though for exposition the flowchart of FIG. 3 is shown in a procedural format, the actual program may not only be written in a procedural style but also be written in an event driven style, with suitable count-down timers or thread timing to allow the program to periodically perform certain functions as described in FIG. 3.

At step decision box 310, the program residing in the memory of the prognostic processor system determines whether it is time to collect sensor data from sensors monitoring the LRU and associated with the prognostic processor. If so, the program proceeds to step box 312, otherwise, the program proceeds to the next decision box 318. As mentioned previously herein, sensor data from LRUs comprise a wide variety of data, including but not limited to: voltage, power, peak power, thermal parameters, temperature, electronic life, vibration, electrical and mechanical contacts, noise, resets of an LRU, the number of times a switch is depressed on an LRU, power glitches, power-on hours of an LRU, accumulative vibration, electronic life, power glitches, acceleration (e.g., as measured by an accelerometer), corrosion or strain.

At step box 312, the prognostic processor program queries the I/O sensors of a prognostic processor, as described herein, to sample data from on-chip and off-chip components and devices, and any data collected is processed by the processor 12 of the prognostic processor, as shown in step box 314, with the processed data added to a historical log for future reference, which is stored in the permanent non-volatile memory of the prognostic processor, as shown in step box 316. Flow of the program then returns to step decision box 318.

At step decision box 318, the program determines whether it is time to collect system data. If so, the program proceeds to step box 320, otherwise, the program proceeds to the next decision box 326.

At step box 320, the program queries for results from other prognostic processors and equipment attached to the system bus 250, as explained herein. This data is processed, as shown in step box 322, the processed data is added to the historical log data, as shown in step box 324, and the program proceeds to the next decision box 326.

At step decision box 326, the program determines whether it is time to run the failure or fault analysis model(s) associated with the prognostic processor(s). The fault analysis (FA) model may be proprietary or open-source, and the result of executing the predictive model with the current sensor and historic log information by the prognostic processor of the present invention will be a prediction of failure. This prediction can be used to calculate the probability that some component (and consequently system) will fail over some finite time period, such as a LRU in avionics electronics. The prognostic model of the present invention could advise when the probability of failure of a required subsystem in an avionics package exceeds some finite time period. The prognostic processor system of the present invention could advise when the probability of failure of a required avionics subsystem exceeds some threshold. Data from past field failures could also be used in the FA model. Economic analysis could be used to set the threshold, in terms of a cost/benefit analysis, in addition to more conventional technical engineering analysis.

Thus, as shown in step box 328, the program executes the FA model, taking into account the historical data collected by prognostic processor 10 for a particular LRU associated with the prognostic processor 10. Historical data from other similar LRUs and historic data of past field failures may also be used. In addition, at step 328, the program could determine if multiple prognostic processors are present, such as in a network of prognostic processors as shown in FIG. 2. If multiple prognostic processors are present the program of the present invention could divide the FA model tasks amongst the prognostic processors for more efficient data flow load balance and program flow management; e.g. one of the prognostic processors from a group of multiple prognostic processors could maintain the history of data collected by the other prognostic processors, and other prognostic processors in the group of multiple prognostic processors could execute the failure analysis model or models to predict system failures in the avionics electronics being monitored.

In step decision box 330, the program checks to see if the FA model predicts a failure or fault is likely with a particular LRU. If so, the program proceeds to step box 332; if not, the program returns to step 310. At step box 332, the LRU is notified of a predicted fault about to occur, or an external monitor such as the Maintenance Equipment 260 is notified, and the program returns to decision box 310. This notification would be issued as a signal or message in the form of an Alerts 44 through the System I/O 41 to the prognostic processor.

The flow chart of FIG. 3 illustrates all significant processing associated with the prognostics and fault prediction; however, it does not include other conventional typical background computer and operating system maintenance tasks. These conventional and typical tasks should be understood by one of ordinary skill in the art from the teachings of the present invention. As an example, the flow chart does not include a background task to produce, monitor, or process system data, such as the Alerts 44, Control 46 and Status 48 messages described herein.

In general, the FA software running the present invention employs a log file history, real-time execution of a predictive model with log file history, a prognostic interface standard, hierarchical processing capability to work with multiple prognostic processors, and the ability to update the FA model with data from field failures, in particular from avionics electronics comprising LRUs.

Further, although the present invention has been described in terms of the preferred embodiments above, numerous modifications and/or additions to the above-described preferred embodiments would be readily apparent to one skilled in the art.

It is intended that the scope of the present invention extends to all such modifications and/or additions and that the scope of the present invention is limited solely by the claims set forth below.

We claim:

1. A computer controlled method for predicting machine failure employing a prognostics processor chip comprising a processor, memory, clock and I/O, components and devices comprising on-chip and off-chip sensors operatively interacting with the I/O; the I/O sending and receiving data from the sensors; and a program stored in the memory and running the processor, the program containing a failure analysis model for predicting machine failure of a machine being monitored by the prognostics processor chip, the method comprising the steps of:

collecting sensor data from the sensors of the prognostics processor by sampling the sensors through the I/O;

processing the sensor data with the processor of the prognostics processor;

storing the processed sensor data in a historic log in the memory of the prognostics processor, wherein the memory comprises non-volatile memory, and the historic log maintains a cumulative collection of sensor data over time;

executing a failure analysis model in the program, the failure analysis model employing the sensor data from the historic log, operatively attaching to the prognostic processor an external equipment monitor external to the prognostic processor, the external equipment monitor separate and apart from the machine being monitored by the prognostic processor;

creating a plurality of prognostic processors for a plurality of machines to be monitored for failure analysis;

connecting each of the plurality of prognostic processors to the machines being monitored for failure analysis;

establishing a network of prognostic processors from the plurality of prognostic processors, said network connected along a system bus;

notifying the machine that a prognostic processor is monitoring that a failure is likely;

issuing queries with the external equipment monitor to the prognostic processor to read registers in the prognostic processor and obtain the historic log data;

forming the network of prognostic processors so that the I/O of the prognostic processors share a common standard;

dividing tasks amongst the network of prognostic processors, wherein, the control and state messages of the system data collected comprise Control messages that will allow the external equipment monitor to control and monitor the prognostic processor and Status messages that return the prognostic processor results to the external equipment requests, the model predicts likely failure of a machine being monitored by the prognostics processor, collecting system data for the prognostics processor by querying the I/O for system data, the system data comprising state and control messages, and storing the processed system data in the historic log in the memory of the prognostics processor, and the network interacts with the external equipment monitor external to the machines being monitored, and the failure analysis model in the program of the prognostic processors indicates when at least one of the machines is likely to fail.

2. The method according to claim 1, further comprising the steps of:

connecting the plurality of prognostic processors to create a hierarchical network, with a first prognostic processor communicating with the external equipment monitor, and the first prognostic processor controlling at least a second prognostic processor through the external equipment monitor.

3. The method according to claim 1, further comprising the step of:

storing in said non-volatile memory past field failures of machines of the kind being monitored by the prognostics processor; wherein, said sensor data is selected from the group of system characteristics of the machine being monitored consisting of: voltage, current, resistance, power, peak power, thermal parameters, temperature, electronic life, vibration, electrical and mechanical contacts, noise, resets of the machine being monitored, the number of times a switch is depressed on the machine being monitored, detection of biological agents, detection of chemical agents, power glitches, power-on hours of the machine being monitored, accumulative vibration, electronic life, power glitches, acceleration, corrosion, mechanical stress or strain; and further comprising the step of, calculating in said failure analysis model when the probability of a component in a machine being monitored will fail over a finite time period, and, calculating for said failure analysis model a threshold for the probability of failure, based on the sensor data and the past field failure data.

4. The method according to claim 1, further comprising the steps of:

calculating in the failure analysis model when the probability of a component in a machine being monitored will fail over a finite time period; and, calculating for the failure analysis model a threshold for the probability of failure.

\* \* \* \* \*